March 26, 1957  L. L. PECK  2,786,418
TIME DELAY SWITCH FOR IRRIGATION SYSTEM
Filed Nov. 30, 1955  2 Sheets-Sheet 1

INVENTOR.
Loyd L. Peck
BY

March 26, 1957    L. L. PECK    2,786,418
TIME DELAY SWITCH FOR IRRIGATION SYSTEM
Filed Nov. 30, 1955    2 Sheets-Sheet 2
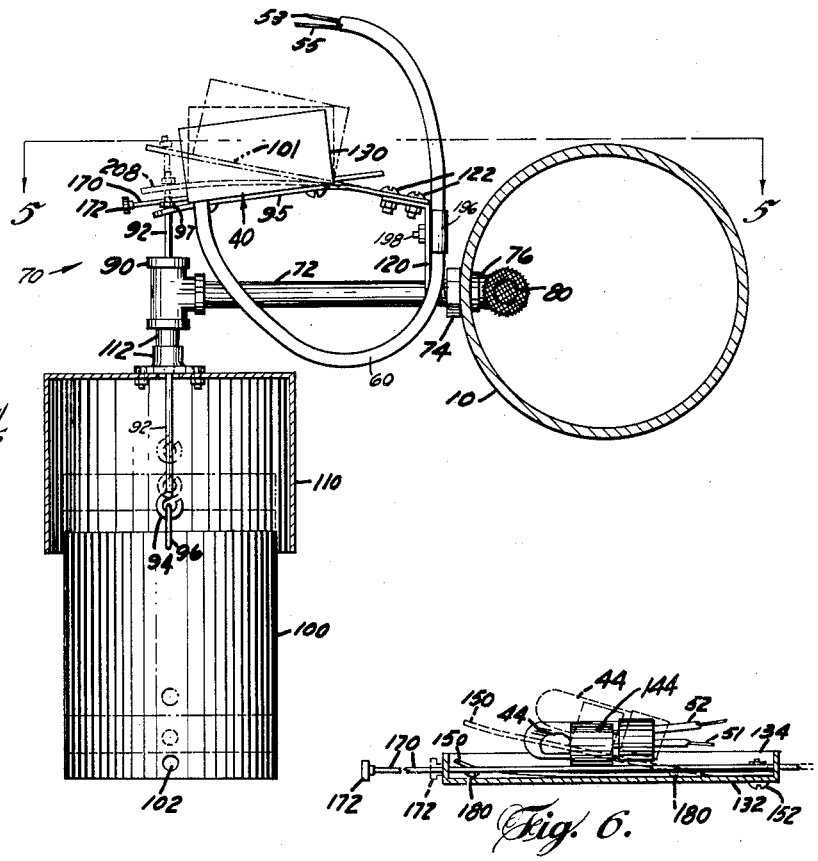
Fig. 4.
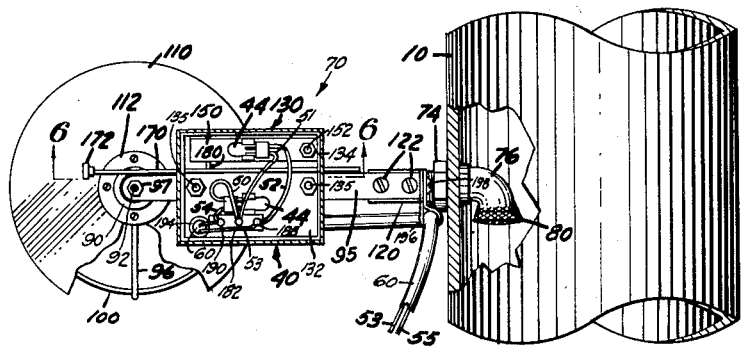
Fig. 6.
Fig. 5.
INVENTOR.
Loyd L. Peck
BY A. Hiram Sturges
Agent United States Patent Office 2,786,418
Patented Mar. 26, 1957

2,786,418

TIME DELAY SWITCH FOR IRRIGATION SYSTEM

Loyd L. Peck, Central City, Nebr.

Application November 30, 1955, Serial No. 550,076

3 Claims. (Cl. 103—25)

This invention relates to irrigation and more particularly it is an object of this invention to provide a time delay switching mechanism for the control of pumps delivering irrigation water from a well or other source of water supply to a system of irrigation ditches or irrigation piping.

In the past it has been a problem that when an irrigation system has been running and becomes shut off due to a momentary power interruption, an operator not in attendance at that time often returns to the well a half a day later to find that no water has been pumped during his absence. Considering the importance of irrigation water in dry areas and in dry season, this can be very costly in terms of crop loss.

It is therefore an object of my invention to provide a time delay switch adapted to assume an off position immediately following power interruption and which attains an on position after the passage of a suitable time interval, such as, for example, two minutes or less.

More particularly it is an object of my invention to provide a group of time delay switches as described, each disposed at its individual well whereby the pumping motor of each well is turned on at a different instant than motors of other wells in the circuit and because of the mechanical differences in the operation of the time delay switches; as is desirable because the high starting load periods of the motors are then spaced apart.

A further objective is to provide a time delay switch principle which is adapted to be adjusted to a wide range of periods of time delay easily regulated in accordance with the size of an exhaust port in a liquid container of the switch and variable also with the size of the container.

A further objective is to provide a time delay switch on the liquid escape principle so constructed that a liquid container thereof is normally constantly full except when power is interrupted.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

Fig. 4 is a side elevation of the time delay switch mechanism attached to an irrigation pipe with certain pipes shown in cross section and alternate positions of the starter switch portion being shown in dotted and broken lines;

Fig. 5 is a view-in-section taken along the line of 5—5 of Fig. 4 with certain parts broken away; and Fig. 6 is a view-in-section taken along line 6—6 of Fig. 5.

Figure 1:
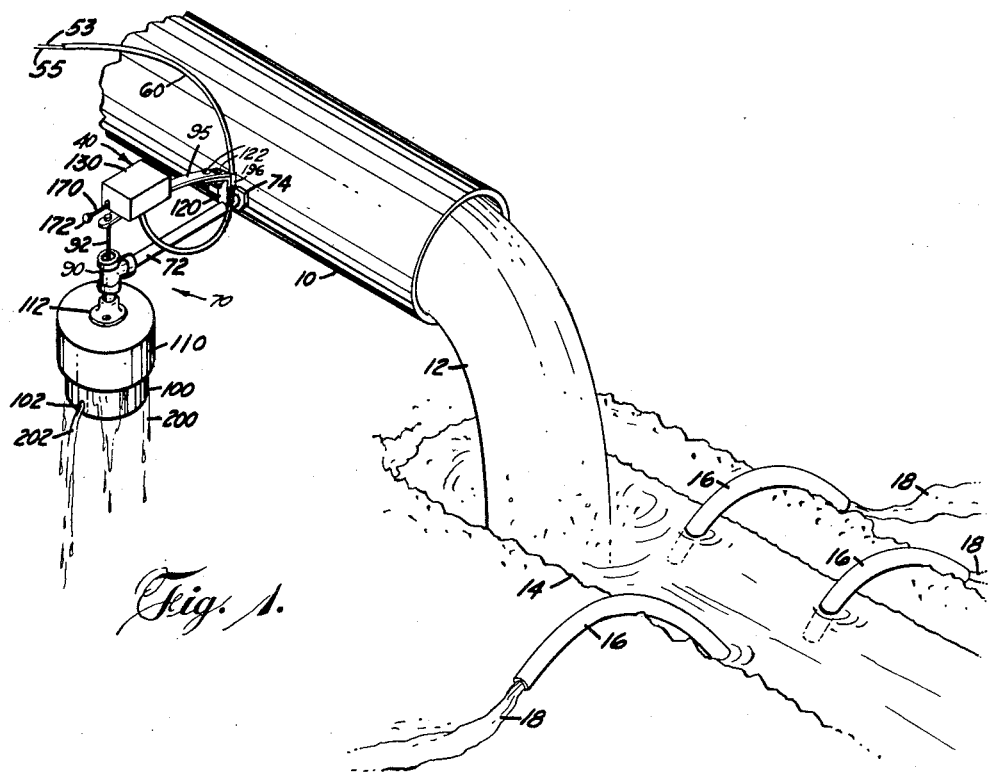
Fig. 1 is a perspective diagrammatic view showing the time delay switch of this invention mounted upon an irrigation pipe delivering water to an irrigation ditch.

The time delay switch of this invention is adapted to be used in combination with an irrigation pipe 10, best seen in Fig. 1. Water 12 from the pipe 10 flows into an irrigation ditch 14.

The ditch 14 has sides banked up to prevent overflow and water is delivered over the sides 14 through siphon hoses 16, the water flowing out from the outer end of the siphon hoses 16, best seen at 18, and onto the field to be irrigated.

It is to be understood that the time delay switch of this invention can be used with other irrigation systems and need not be used only with ditch irrigation, although it is particularly valuable for use with ditch irrigation.

Figures 2, 3:
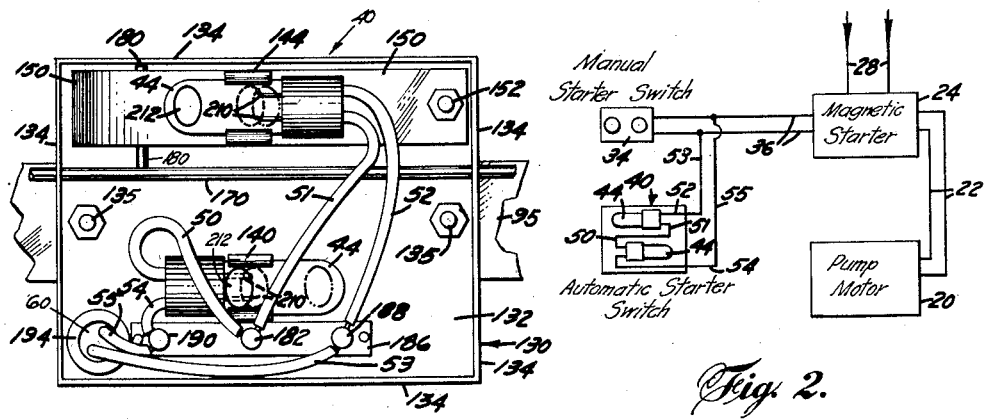
Fig. 2 is an electrical circuit diagram in which the time delay switch is used.
Fig. 3 is a top plan view of an automatic starter switch portion of the time delay switch mechanism with the cover thereof removed.

Referring to Fig. 2, a pump motor is shown at 20 and it is common in irrigation that the pump motor 20 be attached to a pump of a type having turbine wheels, not shown, ordinarily disposed deep in a well with a turbine shaft connecting the turbine wheels to the pump motor, which latter is ordinarily disposed at ground level.

The pump motor 20 is connected by wires 22 to a magnetic starter 24 and the latter receives power through wires 28 from any suitable source of electrical power. Usually the wires 28 extend to a rural power line which also supplies power to many such pumps.

The starter 24 is ordinarily turned on by a manual starter switch 34 which is connected to the magnetic starter 24 by two wires 36.

In accordance with this invention an automatic starter switch 40 is provided and the latter forms a part of the time delay switch mechanism later described. Referring to Fig. 2, the automatic starter switch 40 has two mercury switches 44 oppositely arranged with contacts on opposite ends respectively and connected in series by wires 50 and 51 to two of the terminals of the mercury switches 44. The other terminals of the switches 44 are respectively connected by wires 52 and 53 and 54 and 55 to different ones of the wires 36 respectively whereby the automatic starter switch 40 serves as an automatic substitute for the manual starter switch 34.

As best seen in Figs. 1 and 4, the wires 53 and 55 are encased in an insulating covering 60 from their connection to wires 52 and 54 to their subsequent connection to the respective wires 36.

The time delay switch mechanism of this invention is generally indicated at 70 in Figs. 1 and 4 and has a conduit 72 horizontally disposed and extending through an opening in the side of the irrigation pipe 10. The conduit 72 is threaded on its inner end and is secured to the pipe 10 by suitable means such as a nut 74 and an elbow 76 threadedly secured on the outside and the inside respectively of the pipe 10 and to the threaded inner end of the conduit 72.

The elbow 76 has an open end covered by a screen 80. It is preferable that the open end face the direction of flow of water in the pipe 10.

The conduit 72 has a T 90 mounted on its outer end with ends of the T 90 opening upwardly and downwardly for the disposal therethrough of a vertically disposed rod 92 which latter has a hook 94 on its lower end for attachment to the wire handle 96 of a bucket 100.

The bucket 100 has an aperture 102 in its lower portion of a size for permitting water to escape at a desirable rate.

A cover 110 is disposed across the upper side of the bucket 100 and down across the sides thereof and is suitably attached by means of fittings 112 to the T 90, whereby the cover 110 protects the bucket from rain and dust and other foreign objects or matters yet lets it move up and down, protected in all positions.

The upper end of the rod 92 extends through an aperture of a size for a loose fit for pivoting, in the outer movable end of a resilient member 95 which is preferably a spring of an elongated shape.

The rod 92 is pivotally secured to the spring 95 by a nut 97, best seen in Fig. 4.

The elongated spring 95 is generally disposed in horizontal position, although its natural position is to be extending somewhat upwardly at its outer end and in the upper position shown at 101 in broken lines in Fig. 4.

The spring 95 has a fixed inner end which is attached to a mounting bracket 120 by bolts 122, the bracket 120 being suitably mounted on the conduit 72.

As thus described, the spring 95 is disposed directly above the conduit 72.

Referring to Fig. 3 it will be seen that an automatic starter switch housing 130 having a base portion 132 with upwardly extending side walls 134, is mounted on the upper side of the spring 95 at its outer movable end portion, being secured to the spring 95 by suitable bolts 135.

At this point, it will be understood that the wires 53 and 55 properly protected by the covering 60 pass outwardly of the switch housing 130 through a grommet lined opening 194 provided in the base portion 132 of the housing 130. This is best seen in Figs. 3 and 5, and as best seen in Figs. 1 and 4, the covered wires 53 and 55 are adequately anchored to the time delay switch mechanism 70 by means of a bracket 196 which latter is attached to the rearward side of the mounting bracket 120 by a bolt 198.

Referring to Fig. 3 one of the mercury switches 44 is secured by a suitable bracket 140 directly to the base 132.

The other mercury switch 44 is secured by means of a bracket 144 to a mercury switch mounting spring 150 which latter has that end which is closest to the pipe 10 secured to the base 132 by means of a bolt 152.

The outer end of the mercury switch mounting spring 150 extends upwardly from the base 132. As best seen in Figs. 4, 5 and 6 inclination control rod 170 is slidably disposed through apertures in the upwardly extending side portions 134 of the base 132, the rod 170 being disposed parallel to the base 132. The outer end of the rod 170 has a knob 172 which can be pushed in or pulled out for moving the rod inwardly or outwardly.

The rod 170 is disposed in parallelism with the elongated spring 95 and has an arm 180 attached to it and extending transversely to the rod 170 outwardly under the spring 150. The arm 180 causes the spring 150 to raise upwardly at times when the rod 170 is pushed inwardly toward the pipe 10, and as best seen in Fig. 6.

In dotted lines in Fig. 6, the inner position of the rod 170 is shown in which the arm 180 has moved from an outer position to an extreme inner position shown in dotted lines whereby the spring 150 moves from a lower position into the upper dotted line position shown in Fig. 6.

When the outer end of the mercury switch spring 150 is raised, the respective mercury switch 44 is caused to assume an inclined position with respect to the base 132 and therefore with respect to the spring 95. This is to control the timing of the automatic starter switch of this invention, and as later described.

Referring to Fig. 3, it will be seen that the wires 50 and 51 are connected each to a terminal of a different mercury switch 44 and are each connected to a binding post 182 on an insulating binding post strip 186 which latter is suitably mounted on the base 132.

Connection between the wires 36 and the automatic time delay switch 40 of this invention is made by wires 53 and 55 whereby one end of each of wires 53 and 55 are attached to a respective one of the wires 36.

The opposite end of wire 53 is attached to a binding post 188 provided on the binding post strip 186. The wire 52 then leads from the binding post 188 to the other terminal of the same mercury switch 44 to which the wire 51 is attached.

Likewise, the wire 55 is connected to another binding post 190, provided on the binding post strip 186, and the wire 54 leads from the post 190 to the other terminal of the same mercury switch 44 to which the wire 50 is attached.

In operation, water is normally flowing through the pipe 10 and down through the T 90, through the cover 110 and into the bucket 100. The water normally overflows the bucket 100 as best seen at 200 in Fig. 1, even though water constantly escapes at 202 through the aperture 102.

However, when water ceases to flow in the pipe 10 as a result of a power failure, which latter would cause the pump motor 20 to cease running, then water will cease flowing into the bucket 100. Thereafter, the bucket 100 will cease to overflow and will gradually empty through the aperture 102.

As the bucket 100 empties and becomes lighter, it ceases to pull downwardly as strongly on the spring 95 whereby the spring 95 moves upwardly, gradually passing the position indicated at 208 in dotted lines in Fig. 4 and moving on upwardly to the position shown in broken lines at 101, in Fig. 4.

It will be understood that the full, dotted and broken line representations of the mercury balls 212, illustrated in Fig. 3 correspond to the full, dotted and broken line positions of the automatic starter switch 40, as shown in side elevation of Fig. 4.

During the time period, which shall be called the first time period, before the spring 95 has reached the position 208, there is no connection made by the mercury switches 44 because as long as the mercury switches 44 are inclinedly disposed with respect to level, one will make a contact and the other will not.

As the switches 44 are connected in series, a circuit is not completed through the two mercury switches 44, except at times when the mercury switches 44 are both in level position.

Referring to Fig. 3, it will be seen that the contacts 210 of each mercury switch 44 are not both touched by the respective mercury ball 212 in that mercury switch 44 excepting when the switch is in level.

When the switches are level the balls 212 are in the intermediate positions shown in dotted lines in Fig. 3, and the switches are making contact. The period when the switches are sufficiently level for contact shall be called the second time period and it is then that contact through both switches 44 is complete and the starter 24 is operated for turning on the pump motor 20.

It is desirable that the first time period be of a certain substantial length of time, not less than one minute, to allow the pump to come to a complete stop. The water recedes in the pipe causing the turbine wheels to spin backwards and then come to second stop after the water has completely receded. If the line is energized and the motor started while water is receding the extreme torque applied to the shaft might break it.

If the power in lines 23 is on at the time the switches 44 are making contact, then the pump motor 20 will start, if not the motor 20 will not start and thereafter the pump motor 20 will not start until the manual starter switch 34 is operated. This is of value as otherwise the pump would start at so long a period of time after the original failure that one or many of the siphon hoses 16 would have lost their prime.

It is to be understood that if the pump is again turned on after certain of the siphon tubes 16 have lost their prime, then the siphon tubes do not drain water out of the ditch 14 properly. Instead the water then spills over the sides of the ditch 14 washing the sides away at one or more points whereby the break-through causes land to be flooded and causes all other siphon tubes in the system to lose their prime, whereby the entire system needs repair. It is for this reason that it is very important that the first time period be regulated so that the second time period above described, in which the pump motor 20 is turned on, be not too long a time after a power failure.

The manual control rod 170 is adjusted to regulate the length of the first time period during which the automatic starter of this invention will not operate. When the siphon tubes 16 are disposed close to the pump 20 it is important that the first time period be shorter and this is regulated by moving the rod 170 inward toward the pipe 10. The farther in the rod 170 is toward the fixed end of the spring 150, the shorter the first time period of delay is. The farther out the rod 170 is away from the fixed end of the spring 150, the longer the first time period of delay is.

The time delay switch provides an automatic "off" period in case of a power interruption.

With the time delay switch explained herein, by reason of the different times consumed in the loss of water from the water containers 100 and the difference in the setting of the rods 170 regulating one of the mercury switches of each time delay switch, the pumps will not be reenergized simultaneously, avoiding the danger of an overloaded powerline. If the power is off long enough for my time delay switch to reach its second "off" period the siphon tubes will have lost their prime and the pumps will not resume operation until manually started. This prevents the wells from pumping water into ditches after the siphon tubes are out of operation as causes washouts of the ditch.

As thus described it will be seen that this invention fulfills the objectives above set forth.

From the foregoing description, it is thought to be obvious that a time delay switch for irrigation system constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In combination, a well, an irrigation pipe in operable communication with said well, an electrical irrigation pump disposed in pumping relationship to said well and a magnetic starter for connecting said pump to a power line, a pipe connected to said pump, and a time delay switch comprising: a conduit portion attached through said pipe for delivery of water into said conduit only at times when water is flowing in said pipe, a bucket disposed for receiving water from the other end of said conduit, said bucket having an outlet port in a lower portion thereof, resilient support means disposed above said bucket, and having an upwardly and downwardly movable portion and a fixed portion, mounting means mounting said fixed portion of said support means in a fixed relationship with respect to said conduit, means suspending said bucket from the movable portion of said resilient support means whereby as water in said bucket approaches the empty stage the increasingly lighter weight of the bucket causes the bucket and the movable portion of said resilient means to move upwardly, two mercury switches, means mounting said switches on the movable portion of said resilient means, said switches being operably and oppositely arranged with respect to upward and downward movements of the movable portion of said resilient means, whereby one switch goes on when the said movable portion is in an upper position and the other goes on when the said movable portion is in a lower position and whereby when one switch is on the other is off except when both switches are disposed in level position, and wiring connecting said switches in series and for connection to wiring circuits to be controlled by said time delay switch, and in which the wiring of said time delay switch is connected to said magnetic starter for turning said starter on only when said mercury switches are in a level position, whereby the time delay switch provides an "off" period during which there is no electrical connection to the magnetic starter, and whereby after a suitable "off" period the switching arrangement automatically makes an electrical contact to the magnetic starter if the power line has been re-energized, and the pump will resume normal operation.

2. The combination of claim 1 in which said means mounting said switches on said movable portion of said resilient means comprises a movable mounting for one of said mercury switches and means for adjusting said movable mounting to cause said one mercury switch to assume a certain desired inclination with respect to said resilient support means whereby the length of time during which the upward movement of said bucket from a downward position of overflow to a position in which said mercury switches are both level can be adjusted, and whereby said movable mounting and said mounting adjustment means makes possible the regulation of said "off" period.

3. The combination of claim 1 in further combination with an irrigation ditch arranged to receive water from said pipe and siphon tubes arranged in said ditch for delivering water over the sides of said ditch whereby if the power is off long enough for the said time switch to reach a second "off" period following and "on" position when said mercury switches are level, then the siphon tubes will have lost their prime and the pump will not resume operation until manually started for preventing the pump from pumping water into said ditch after the siphon tubes are out of operation to avoid a washout of the ditch.

References Cited in the file of this patent

UNITED STATES PATENTS 2,052,083    Dayton    Aug. 25, 1936